Nov. 11, 1941.    G. A. ZIETS    2,262,083
RETAINER FOR VALVE SPRINGS
Filed Sept. 2, 1939

INVENTOR
GEORGE A. ZIETS
BY
ATTORNEY

Patented Nov. 11, 1941

2,262,083

UNITED STATES PATENT OFFICE 2,262,083

RETAINER FOR VALVE SPRINGS

George A. Ziets, Dunellen, N. J., assignor to Wright Aeronautical Corporation, a corporation of New York Application September 2, 1939, Serial No. 293,243

3 Claims. (Cl. 251—144)

This invention relates to valves for internal combustion engines, being particularly concerned with an improved form of valve lock.

In conventional engines, poppet valve stems are provided with one or more annular grooves of semi-circular or rectangular form. Over the valve stem a spring seat washer is supplied and upon compressing the valve springs, a pair of semi-circular locks are fitted in the stem grooves, after which the washer is allowed to rise, covering the locks and holding them in position and preventing the washer from axial displacement under the influence of the springs. Since it is desirable to minimize valve weight to minimize inertia effects during engine operation, the form of the valve stem lock is important, and the prior art arrangements have so decreased the cross-sectional area of the valve stem as to weaken the latter unduly.

It is accordingly an object of this invention to provide a valve stem lock and complementary stem groove which will not weaken the valve stem materially and which will also allow of self-centering action.

Figure 1:
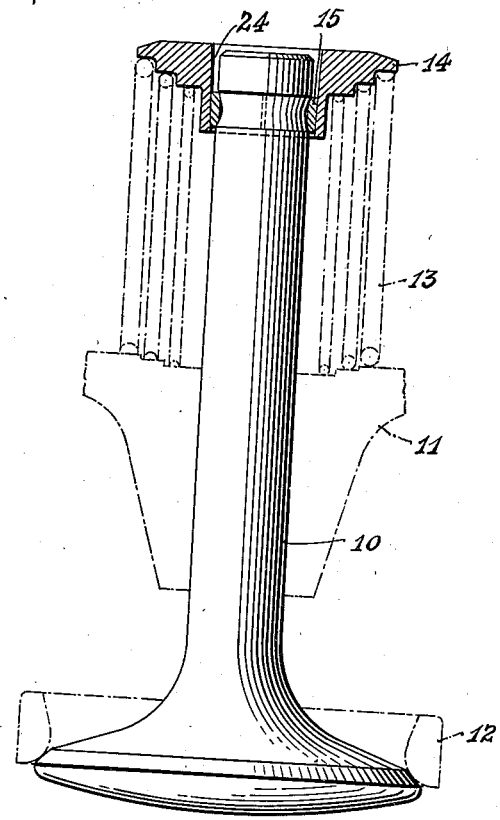
Figure 2:
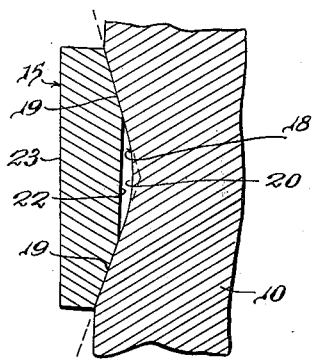

The details of the invention will be appreciated in reading the annexed descriptions in connection with the drawing, in which, Fig. 1 is a side elevation of a valve provided with the locking device of the invention, and;

Fig. 2 is an enlarged fragmentary section through a portion of the valve stem and lock.

A conventional valve 10 is guided in a valve guide 11 the valve head being seated upon a valve seat 12. The valve is held against its seat through the action of one or more springs 13 seating at their lower ends upon the top of the valve guide and at their upper ends upon a washer 14 slipped over the top end of the valve stem and secured thereto by a pair of semi-circular locks 15.

According to this invention, the valve stem is grooved as at 18, the groove form, shown in Fig. 2, comprising tapered portions 19 starting from the full diameter of the valve stem and approaching each other in the middle of the groove whereat a fillet 20 is formed. The angle which the tapered portions make with cylindrical elements of the valve stem should be quite small—of the order of 12 to 15 degrees—so that there is little diminution of the cross-sectional area of the stem. In view of the gradual slope of the groove profile, without any sharp edges, the valve stem will be substantially stronger in tension than is obtained with conventional grooving.

The semi-circular valve locks 15 are formed with an internal profile complementary to the tapers 19, but the central portion of the interior lock profile is relieved from contact with the fillet 20 as at 22. The exterior surface of the lock 15 is slightly tapered as at 23 in complement to a corresponding taper 24 in the bore of the spring washer 14. Thus, when the locks 15 are placed in position in the groove and the washer is elevated to hold them in place, the tapers 19 will afford proper centering of the assembly with no possibility of side play. The spring load will be transmitted from the washer 14 through the locks 15 through the tapers 23 and 24 and thence to the valve stem through the upper tapered surface 19 of the valve stem. Due to the relatively long contact area of the valve locks with the valve stem groove surface, the stress intensity on the valve stem will be low, minimizing the possibility of failure, and imposing upon the valve stem an almost radial compressive stress. This distinguishes over conventional practice wherein the force transmitted from the valve lock through the stem is directed axially of the stem with little or no radial component.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A valve stem having an annular groove the surface of which is defined by opposed conical frusta, the intersection of said frusta being filleted, and a pair of semi-annular lock pieces having inner surfaces formed in complement to the stem frusta, the central part of said lock pieces being relieved so that contact between each piece and the groove occurs only on the conical portions thereof.

2. A valve stem having an annular groove the surface of which is defined by opposed conical frusta, the intersection of said frusta being filleted, and a pair of semi-annular lock pieces having inner surfaces formed in complement to the stem frusta, the central part of said lock pieces being relieved so that contact between each piece and the groove occurs only on the conical portions thereof, each cone defining said frusta having an included angle at its apex of less than 60 degrees whereby diminution in stem diameter due to the groove is relatively small and whereby the cross-sectional area in the valve stem at the groove root nearly equals that in the valve proper.

3. A cylindrical valve stem having a shallow groove near one end thereof, the profile of said groove comprising conical elements starting near the stem end and making an angle of not more than 20 degrees with the surface elements of the cylindrical stem, and semi-circular lock pieces embracing the stem and engaging the groove surface, the inner profile of said lock pieces being formed complementary to the groove profile, but being relieved in such a manner as to have clearance with respect to the deepest part of the groove.

GEORGE A. ZIETS.